United States Patent
Payzer et al.

(10) Patent No.: US 10,592,070 B2
(45) Date of Patent: Mar. 17, 2020

(54) USER INTERFACE DIRECTIONAL NAVIGATION USING FOCUS MAPS

(71) Applicant: Microsoft Technology Licensing, LLC, Redmond, WA (US)

(72) Inventors: Gersh Payzer, Seattle, WA (US); MinJie Tong, Issaquah, WA (US); Christopher Ian Pick, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 936 days.

(21) Appl. No.: 14/880,858

(22) Filed: Oct. 12, 2015

(65) Prior Publication Data
US 2017/0102847 A1    Apr. 13, 2017

(51) Int. Cl.
*G06F 3/0482*    (2013.01)
*G06F 3/0484*    (2013.01)
(Continued)

(52) U.S. Cl.
CPC .......... *G06F 3/0482* (2013.01); *G06F 3/0484* (2013.01); *G06F 3/04842* (2013.01);
(Continued)

(58) Field of Classification Search
CPC .. G06F 3/04842; G06F 3/0484; G06F 3/0482; G06F 9/451; G06F 9/4552; G06F 8/38
See application file for complete search history.

(56) References Cited

U.S. PATENT DOCUMENTS

| | | |
|---|---|---|
| 5,548,703 A | 8/1996 | Berry et al. |
| 6,249,284 B1 | 6/2001 | Bogdan |

(Continued)

FOREIGN PATENT DOCUMENTS

WO    2011054072 A1    5/2011

OTHER PUBLICATIONS

"Focus and Selection", Published on: Sep. 5, 2014, Available at: https://developer.mozilla.org/en-US/docs/Mozilla/Tech/XUL/Tutorial/Focus_and_Selection.

(Continued)

*Primary Examiner* — Kieu D Vu
*Assistant Examiner* — Rami R Okasha
(74) *Attorney, Agent, or Firm* — Alleman Hall Creasman & Tuttle LLP

(57) ABSTRACT

A computing device comprising a computer program executed on a processor of the computing device, including: a rendering module configured to read stored instructions to display a graphical user interface, the stored instructions including code for a plurality of focusable GUI elements, each focusable GUI element having an associated identifier, a focus map module configured to store a precomputed focus map including a focus map entry for each focusable GUI element indicating, for that focusable GUI element, for a plurality of predetermined navigation directions, a target identifier of a target focusable GUI element for that navigation direction, a user input module configured to receive a user input of a predetermined navigation direction, a focus module configured to query the precomputed focus map with an identifier of a currently focused GUI element and the predetermined navigation direction to retrieve and move focus to the target focusable GUI element.

16 Claims, 7 Drawing Sheets

(51) Int. Cl.
  *G06F 9/451* (2018.01)
  *G06F 8/38* (2018.01)
  *G06F 9/455* (2018.01)

(52) U.S. Cl.
  CPC .............. *G06F 8/38* (2013.01); *G06F 9/451* (2018.02); *G06F 9/4552* (2013.01)

(56) References Cited

U.S. PATENT DOCUMENTS

| | | | |
|---|---|---|---|
| 6,606,106 B1 | 8/2003 | Mendenhall et al. | |
| 6,614,457 B1* | 9/2003 | Sanada | G06F 3/0489 348/E5.105 |
| 6,928,619 B2 | 8/2005 | Clow et al. | |
| 7,055,108 B2 | 5/2006 | Goloshubin et al. | |
| 7,620,890 B2 | 11/2009 | Dietl et al. | |
| 7,631,272 B2 | 12/2009 | Bodgan et al. | |
| 7,631,278 B2* | 12/2009 | Miksovsky | G06F 9/451 715/857 |
| 7,636,897 B2* | 12/2009 | Koralski | G06F 9/451 715/767 |
| 7,669,149 B2* | 2/2010 | Dietl | G06F 17/30899 704/270.1 |
| 7,712,051 B2 | 5/2010 | Chadzelek et al. | |
| 7,735,016 B2 | 6/2010 | Celik et al. | |
| 8,127,229 B2* | 2/2012 | Inoguchi | G06F 9/451 715/273 |
| 8,281,258 B1* | 10/2012 | Dixon | G06F 3/04892 715/819 |
| 8,314,809 B1* | 11/2012 | Grabowski | G06T 15/20 345/548 |
| 8,572,209 B2 | 10/2013 | Healey et al. | |
| 8,843,849 B2 | 9/2014 | Neil et al. | |
| 9,015,620 B1 | 4/2015 | Delker et al. | |
| 9,477,399 B1* | 10/2016 | Wardle | G06F 3/0488 |
| 2003/0156141 A1 | 8/2003 | Good et al. | |
| 2004/0090463 A1* | 5/2004 | Celik | G06F 3/0481 715/767 |
| 2005/0071777 A1* | 3/2005 | Roessler | G06F 9/451 715/810 |
| 2005/0091604 A1 | 4/2005 | Davis | |
| 2005/0108681 A1* | 5/2005 | Bent | G06F 8/38 717/109 |
| 2005/0114791 A1* | 5/2005 | Bollenbacher | G06F 3/0485 715/787 |
| 2006/0059458 A1 | 3/2006 | Plummer | |
| 2006/0262146 A1* | 11/2006 | Koivisto | G06F 3/0485 345/676 |
| 2007/0061749 A1* | 3/2007 | de Souza | G06F 3/0481 715/767 |
| 2007/0092243 A1* | 4/2007 | Allen | G06F 3/0482 396/121 |
| 2007/0159464 A1 | 7/2007 | Seo et al. | |
| 2008/0229206 A1 | 9/2008 | Seymour et al. | |
| 2009/0183099 A1 | 7/2009 | Paas | |
| 2011/0113364 A1* | 5/2011 | Neil | G06F 3/0482 715/802 |
| 2011/0202834 A1 | 8/2011 | Mandryk et al. | |
| 2011/0302532 A1* | 12/2011 | Missig | G06F 3/0416 715/823 |
| 2012/0158752 A1* | 6/2012 | Chakka | G06F 16/16 707/752 |
| 2012/0221974 A1* | 8/2012 | Trotta | G06F 3/0485 715/823 |
| 2013/0007590 A1* | 1/2013 | Rivera | G06F 3/0481 715/234 |
| 2014/0108981 A1* | 4/2014 | Payzer | G06F 3/0481 715/767 |
| 2014/0325368 A1 | 10/2014 | Cragun et al. | |
| 2016/0124917 A1* | 5/2016 | Ducat | G06F 3/0484 715/760 |

OTHER PUBLICATIONS

"HTML 5", Retrieved at <<http://www.w3.org/TR/2009/WD-html5-20090212/editing.html>>, Mar. 7, 2009, pp. 13.

"A user agent developer's guide to understanding and implementing Accessible Rich Internet Applications", Retrieved at <<http://www.w3.org/TR/2010/WD-wai-aria-implementation-20100916/>>, Sep. 16, 2010, pp. 27.

Shrinivasan, Yedendra, B."Supporting the Sensemaking Process in Visual Analytics", Retrieved at <<http://alexandria.tue.nl/extra2/201010444.pdf>>, Jun. 2010, pp. 160.

ISA European Patent Office, International Search Report & Written Opinion for Patent Application No. PCT/US2013/064419, dated Feb. 10, 2014, 10 Pages.

* cited by examiner

PRECOMPUTED FOCUS MAP 44

| COMPONENT FOCUS MAP ENTRY | | | | COMPONENT FOCUS MAP ENTRY | | | |
|---|---|---|---|---|---|---|---|
| COMPONENT ID: C1<br>LEFT → NULL<br>RIGHT → C2<br>UP → NULL<br>DOWN → NULL | | | | COMPONENT ID: C2<br>LEFT → C1<br>RIGHT → NULL<br>UP → NULL<br>DOWN → NULL | | | |
| FOCUS MAP ENTRY | FOCUS MAP ENTRY | FOCUS MAP ENTRY | | FOCUS MAP ENTRY | FOCUS MAP ENTRY | FOCUS MAP ENTRY | FOCUS MAP ENTRY |
| ID: E1<br>LEFT → NULL<br>RIGHT → NULL<br>UP → NULL<br>DOWN → E2 | ID: E2<br>LEFT → NULL<br>RIGHT → NULL<br>UP → E1<br>DOWN → E3 | ID: E3<br>LEFT → NULL<br>RIGHT → NULL<br>UP → E2<br>DOWN → NULL | | ID: E4<br>LEFT → NULL<br>RIGHT → E5<br>UP → NULL<br>DOWN → E6 | ID: E5<br>LEFT → E4<br>RIGHT → NULL<br>UP → NULL<br>DOWN → E7 | ID: E6<br>LEFT → NULL<br>RIGHT → E7<br>UP → E4<br>DOWN → NULL | ID: E7<br>LEFT → E6<br>RIGHT → NULL<br>UP → E5<br>DOWN → NULL |

FIG. 4

USER INTERFACE DIRECTIONAL NAVIGATION USING FOCUS MAPS

BACKGROUND

Modern graphical user interfaces (GUIs) can include components such as text fields, radio buttons, drop down menus, and virtual keyboards, which can receive input device focus and receive user input from an input device. Many of these GUIs also provide users the ability to navigate between such focus receiving GUI components, for example, using arrow keys on a keyboard or a directional pad (D-PAD) on a game controller.

SUMMARY

To improve experiences in this area, a computing device for directional navigation of a graphical user interface is provided. The computing device may comprise a computer program executed on a processor of the computing device, including: a rendering module configured to read stored instructions to display a graphical user interface (GUI) on a display associated with the computing device, the stored instructions including code for a plurality of focusable GUI elements, each focusable GUI element having an associated identifier, a focus map module configured to store a pre-computed focus map including a focus map entry for each focusable GUI element indicating, for that focusable GUI element, for one or more of a plurality of predetermined navigation directions, a target identifier of a target focusable GUI element for that navigation direction, a user input module configured to receive a user input of a predetermined navigation direction via a user input device associated with the computing device, a focus module configured to query the precomputed focus map with an identifier of a currently focused GUI element and the predetermined navigation direction to retrieve a target identifier of a target focusable GUI element and move focus to the target focusable GUI element, and wherein the user input module is further configured to map user input to the target focusable GUI element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates a completed focus map for the example GUI of FIG. 2.

DETAILED DESCRIPTION

When processing the focus navigation commands discussed above, many modern GUIs suffer from perceivable delays in response times due to the processing bandwidth consumed by such commands, particularly when executed under hardware constraints such as processor bandwidth restrictions. Current focus algorithms for directional navigation of GUIs are just-in-time algorithms that are run after the user has input a navigation command. These just-in-time focus algorithms generally iterate through the user interface (UI) tree of the GUI and perform bounding rectangle calculations to find the nearest neighbor focusable element of the UI tree, and move focus to that element. However, these focus algorithms have the drawback of having speed that is directly proportional to the complexity of the UI tree, and thus produce noticeable stuttering of the UI and lag in response time when the UI tree is complex and/or while operating with limited processor bandwidth.

Figure 1:
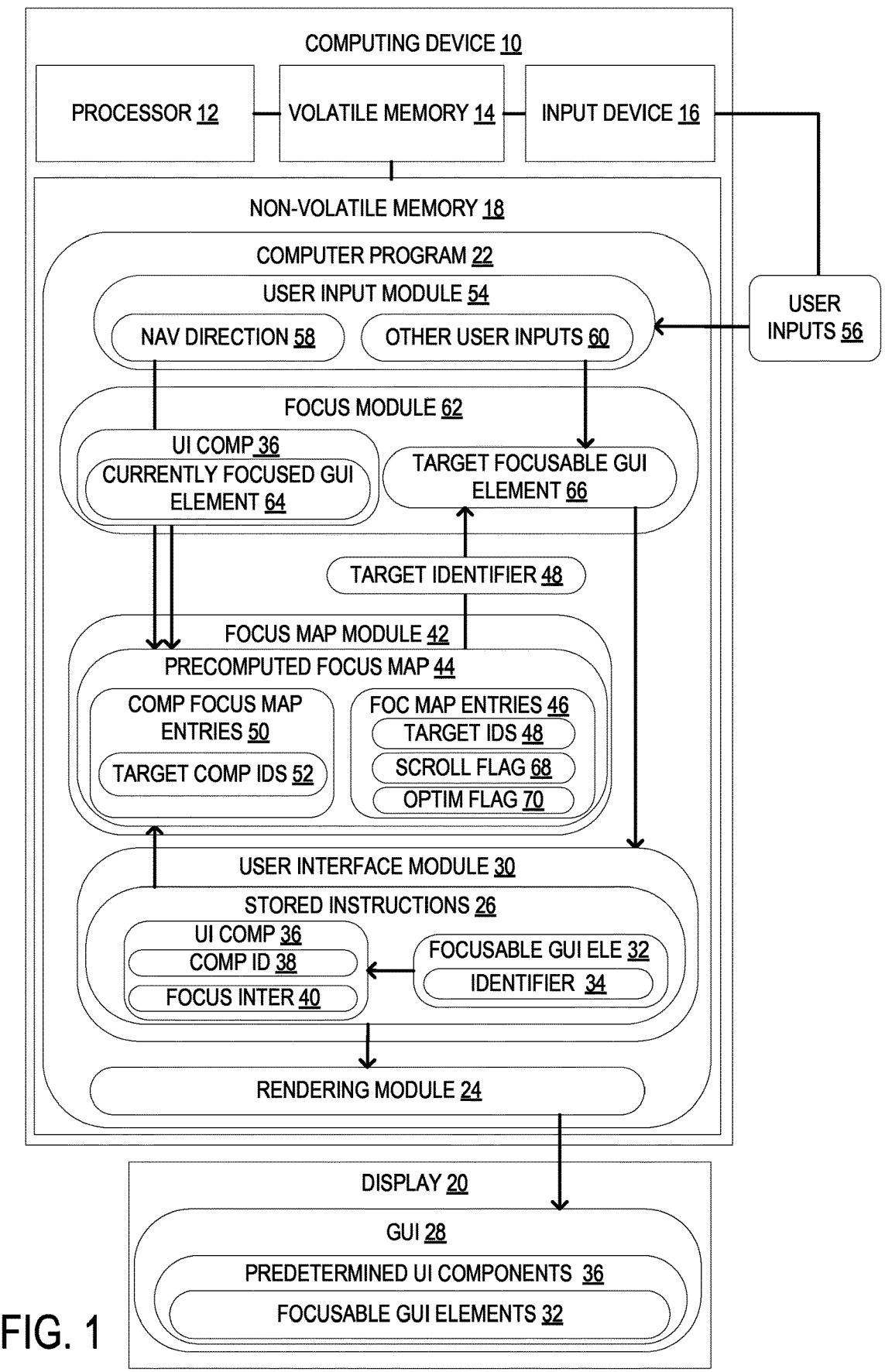
FIG. 1 is a schematic view of one embodiment of a computing device for directional navigation of a graphical user interface (GUI).

To address these issues, the devices and methods described below are provided. FIG. 1 illustrates an example computing device 10 having a processor 12 and associated volatile memory 14 (such as RAM), an input device 16, non-volatile memory 18 (such as a solid state drive, hard disk drive, etc.) and an associated display 20. The computing device 10 further comprises a computer program 22 executed on the processor 12 of the computing device 10. It will be appreciated that the computing device 10 may take multiple forms, such as a desktop computer, laptop computer, tablet computer, smartphone, smart screen, console computing device, and head mounted display device as a few non-limiting examples. Additionally, the input device 16 may be any input device that is configured to receive directional input from a user of the computing device, such as a console controller that includes a D-PAD or a joystick, or a keyboard that includes directional arrow keys.

The computer program 22 includes a rendering module 24 configured to read stored instructions 26 to display a graphical user interface (GUI) 28 on a display 20 associated with the computing device 10. The stored instructions 26 may be stored by a user interface module 30 of the computer program 22. The stored instructions 26 include code for a plurality of focusable GUI elements 32, each focusable GUI element having an associated identifier 34. The focusable GUI elements 32 may receive focus, such that subsequent user input is mapped to the currently focused element to execute a function of the currently focused element. Additionally, in one specification example, the associated identifier 34 for each focusable GUI element may be a globally unique identifier (GUID), however it will be appreciated that other computer identifiers are possible.

In one embodiment, the stored instructions 26 further include a plurality of predetermined user interface components 36, each predetermined user interface component 36 having an associated component identifier 38, including one or more of the plurality of focusable GUI elements 32, and having predetermined focus interactions 40 for the one or more included focusable GUI elements 32. The predetermined user interface components 36 associate a set of the focusable GUI elements 32 into a group that has predetermined focus interactions between the focusable GUI elements 32 in the group. Similarly to the focusable GUI element identifier 34, the associated component identifier 38 may also be a GUID or any other suitable identifier. Additionally, the predetermined user interface components 36 may either be focusable components or non-focusable components. If the predetermined user interface components 36 are non-focusable components, the predetermined focus interactions 40 may include an initial focus target of the one or more of the plurality of included focusable GUI elements that focus will be moved to instead of the non-focusable predetermined user interface component.

In one specific example, a predetermined user interface component 36 may be a dropdown menu wherein the one or more focusable GUI elements are included in the predetermined user interface component 36 as a list of focusable GUI elements, and arranged in a vertical list in the graphical user interface 28 when displayed to the user. In this example, the dropdown menu may have the predetermined focus interactions 40 of moving focus to a previous focusable GUI element in the list when the user enters an up directional input and moving focus to a next focusable GUI element in the list when the user enters a down direction input.

In one embodiment, the predetermined user interface components 36 may also include other nested predetermined user interface components 36. For example, a drop down menu predetermined user interface component may include a list of other predetermined user interface components that are each horizontal lists of one or more focusable GUI elements.

It will be appreciated that the predetermined user interface components 36 are not limited to dropdown menus, and may take other forms having different predetermined focus interactions 40. As a few non-limiting examples, the predetermined user interface component 36 may be a List, a Button, a Radio, a Date picker, a Calendar, a Media player, a Toolbar, a Context menu, a Picture viewer, a Hyperlink, a Flyout, a Dialog, a Hub, Tabs, a Textbox, an Expand/collapse pattern, a Menu, an Auto-suggest, a Form, a Scrolling container, a Tree, a Table, a Tooltip, a Wizard, a Grid, or a Page.

The computer program 22 is configured to pre-compute a focus map of focus targets and focus interactions between the plurality of focusable GUI elements 32 before the user enters a directional navigation input. For example, the computer program 22 may compute the focus map at build time, compile time, and/or run-time of the computer program 22. Additionally, the computer program 22 includes a focus map module 42 configured to store a precomputed focus map 44 including a focus map entry 46 for each focusable GUI element 32 indicating, for that focusable GUI element, for one or more of a plurality of predetermined navigation directions, a target identifier 48 of a target focusable GUI element for that predetermined navigation direction. It will be appreciated that there may be any suitable number of predetermined navigation directions. For example, an input device 16 that includes a D-PAD may have four predetermined navigation directions while a joystick input device may have 8 or more predetermined navigation directions. Additionally, each predetermined navigation direction for a focusable GUI element does not necessarily have an associated target focusable GUI element. For example, if there is not a focusable GUI element to the left of a currently focused GUI element, then the focus map entry for the currently focused GUI element will not indicate a target focusable GUI element for the left predetermined navigation direction.

In one embodiment, the precomputed focus map 44 further includes a component focus map entry 50 for each predetermined user interface component 36 indicating, for that predetermined user interface component, for one or more of the plurality of predetermined navigation directions, a target component identifier 52 of a target predetermined user interface component. Similarly to the focus map entries 46, each predetermined navigation direction for a predetermined user interface components does not necessarily have an associated target predetermined user interface component. For example, if there is not a predetermined user interface component to the left of the predetermined user interface component that includes the currently focused GUI element, then the component focus map entry 50 for that predetermined user interface component will not indicate a target component identifier 52 for the left predetermined navigation direction.

The focus map module 42 may compute the focus map using any suitable focus algorithm. In one specific example, the focus map module 42 may iterate through the plurality of focusable GUI elements 32 in stored instructions 26, perform a bounding rectangle calculation or another suitable algorithm to determine a nearest neighbor focusable GUI element for each predetermined direction, and store the result in a focus map entry 46 for each focusable GUI element 46. In another example, the focus map module 42 may separately process each predetermined user interface component 36 with that component's included focusable GUI element 32. Thus, rather than performing bounding rectangle calculations, the focus map module may determine focus targets for each focusable GUI element 32 based on the predetermined focus interactions 40 of the predetermined user interface component 36 containing that focusable GUI element 32.

The computer program 22 further includes a user input module 54 configured to receive a user input 56 of a predetermined navigation direction 58 via a user input device 16 associated with the computing device 10. It will be appreciated that the user input 56 does not necessarily have a one-to-one association with the predetermined navigation directions 58. For example, the user input module 54 may have a user setting to invert controls, and a user input 56 of an up input may be associated with a down predetermined navigation direction. In another example, the user input 56 may be input from a joystick of the input device 16 and may have separate input for all 360 degrees of rotation. In this example, the user input module 54 may bin the separate inputs for all 360 degrees into groups, with each group being associated with a different predetermined navigation direction. The user input module 54 also receives other user inputs 60, such as a non-navigational button input of the input device 16. For example, the other user inputs 60 may be inputs to execute a function of a currently focused GUI element. In other examples, the navigation direction could further be determined by the user input module 54 based on other types of user input, such as touch gesture input on a touch screen, three dimensional gesture input detected by a depth camera associated with the computing device, eye gaze movements detected by a camera associated with the computing device, voice commands detected by a microphone and associated speech processing algorithms, etc.

After receiving the user input 56 of a predetermined navigation direction 58, the user input module 54 sends the predetermined navigation direction to a focus module 62 of the computer program 22. The focus module 62 is configured to query the precomputed focus map 44 with an identifier 34 of a currently focused GUI element 64 and the predetermined navigation direction 58 to retrieve a target identifier 48 of a target focusable GUI element 66 and move focus to the target focusable GUI element 66. The precomputed focus map 44 may be any suitable data structure that provides a function to lookup a focus map entry 46 associated with the identifier of a focusable GUI element. Thus, the focus module 62 queries the precomputed focus map 44 with the identifier 34 of the currently focused GUI element 64 to lookup the focus map entry 46 associated with the currently focused GUI element. Then, the focus module 62 determines whether a target identifier of a target focusable GUI element is associated with the predetermined navigation direction 58 for that focus map entry. If a target identifier 48 is associated with the predetermined navigation direction 58 for that focus map entry for the currently focused GUI element 64, then the focus map module 42 sends the target identifier 48 to the focus module 62.

After retrieving the target identifier 48, the focus module 62 moves focus to the target focusable GUI element 66 associated with the target identifier 48. Next, the user input module 54 is further configured to map user input 56 to the target focusable GUI element 66. The user input 56 mapped to the target focusable GUI element 66 may be the other user inputs 60 such as inputs to execute a function of the target focusable GUI element 66. In addition to moving focus, the focus module 62 may also be configured to visually or auditorily indicate which focusable GUI element is the currently focused GUI element. For example, the focus module 62 may be configured to cause the rendering module 24 to highlight, shadow, read outloud, play a predetermined sound, or otherwise visually or auditorily indicate the currently focused GUI element.

On the other hand, if a determination is made that no target focusable GUI element 66 is indicated for the predetermined navigation direction 58 for the currently focused element 64, the focus module 62 is further configured to query the precomputed focus map 44 with a component identifier 38 of a predetermined user interface component 36 that includes the currently focused element 64 and the predetermined navigation direction 58 to retrieve a target component identifier 52 of a target predetermined user interface component and move focus to a focusable GUI element 32 included in the target predetermined user interface component 36. The focusable GUI element 32 that focus is moved to may be specified in the predetermined focus interactions 40 of the predetermined user interface component 36 that includes the currently focused GUI element 64. In one specific example, if the predetermined user interface component 36 is a dropdown menu, the predetermined focus interactions 40 may include instructions to move focus to the focusable GUI element 32 at the top of the dropdown menu.

In one embodiment, the user interface module 30 of the computer program 22 is further configured to modify the graphical user interface 28 to add a new focusable GUI element 32 to a predetermined user interface component 36, remove a focusable GUI element 32 included in the predetermined user interface component 36, or modify a focusable GUI element 32 included in the predetermined user interface component 36. The graphical user interface 28 may be modified by the user of the computing device 10 or by an update from a server in communication with the computing device 10. Modifying a focusable GUI element 32 may include moving that focusable GUI element to a different location within the predetermined user interface component, which may change the focus interactions of the included focusable GUI elements. However, it will be appreciated that other modifications may be made to the focusable GUI elements 32. Additionally, if the graphical user interface 28 has been modified, the focus map module 42 is further configured to recompute focus map entries 46 for each focusable GUI element 32 included in the predetermined user interface component 36 based on the predetermined focus interactions 40 of the predetermined user interface component 36. In one specific example, if the predetermined user interface component 36 is a dropdown menu, and a new focusable GUI element 32 is added to that predetermined user interface component 36, then the focus map module may be configured to recompute a focus map entries 46 for the included focusable GUI elements according to dropdown menu predetermined focus interactions.

In one embodiment, each focus map entry 46 further includes a scroll flag 68 indicating whether the display 20 will be scrolled when the focus module 62 moves focus to a focusable GUI element 32 of that focus map entry 46. For example, the display 20 will be scrolled if focus module 62 moves focus to a focusable GUI element that is outside of the viewport being displayed of display 20. The scroll flag 68 may be precomputed at run-time or build time by the focus map module 42, which may be configured to run visibility calculations and layout passes of the graphical user interface 28 to determine whether any of the plurality of focusable GUI elements 32 are outside an initially displayed portion of the graphical user interface 28, and set the scroll flag 68 in the focus map entries 46 for those focusable GUI elements to indicate that the display 20 will be scrolled when focus is moved to those focusable GUI elements. Additionally, the scroll flag 68 for each focusable GUI element 32 may be recomputed after the display 20 has been scrolled.

Further in the above embodiment, if a focus map entry 46 for the target focusable GUI element 66 includes a scroll flag 68 indicating that the display 20 will not be scrolled, the focus module 62 is further configured to move focus to the target focusable GUI element 66 without performing visibility calculations and layout passes of the graphical user interface 28. As discussed above, the visibility calculations and layout passes of the graphical user interface 28 have already been precomputed and the focus map entries 46 for each focusable GUI element 32 indicate whether the display 20 will need to be scrolled when focus is moved to that focusable GUI element. Thus, if the scroll flag 68 for the target focusable GUI element 66 indicates that the display 20 will not be scrolled, then the focusable map module 62 will safely be able to move focus to the target focusable GUI element without needing to perform additional visibility and layout calculations.

In one embodiment, the stored instructions 26 include focusable GUI elements 32 and predetermined user interface components 36 for which focus map entries 46 and component focus map entries 50 cannot be precomputed. For example, legacy code or code integrated from other computer programs may have focusable GUI elements that are not suitable for precomputing focus interactions between those focusable GUI elements. In this embodiment, the plurality of focusable GUI elements 32 includes a subset of focusable GUI elements for which focus interactions are not precomputed, and each focus map entry 46 for the subset of focusable GUI elements includes an optimization flag 70 indicating that the focus interactions of that focusable GUI element are not precomputed. When the focus module 62 queries the precomputed focus map 44 with an identifier of the currently focused GUI element 64 and the predetermined navigation direction 58, the focus map module 42 checks the optimization flag 70, and indicates to the focus module 62 whether focus interactions for the currently focused GUI element were precomputed. If the focus interactions of for currently focused GUI element were precomputed, the focus map module 42 continues as discussed above and sends a target identifier 48 of a target focusable GUI element 66 associated with the predetermined navigation direction 58 for the currently focused GUI element 64.

On the other hand, if the focus map entry 46 for the currently focused GUI element 64 includes an optimization flag 70 indicating that the focus interactions of that focusable GUI element 64 are not precomputed, the focus module 62 is further configured to perform a just-in-time focus algorithm to determine a target focusable GUI element. The just-in-time focus algorithm may be any current focus algorithms that operate at run time after the user has entered a navigation input. For example, the just-in-time algorithm may iterate through the focusable GUI elements 32 included in the stored instructions 26, and perform bounding rectangle calculations to find and move focus to a nearest neighbor in the graphical user interface 28.

Figure 2:
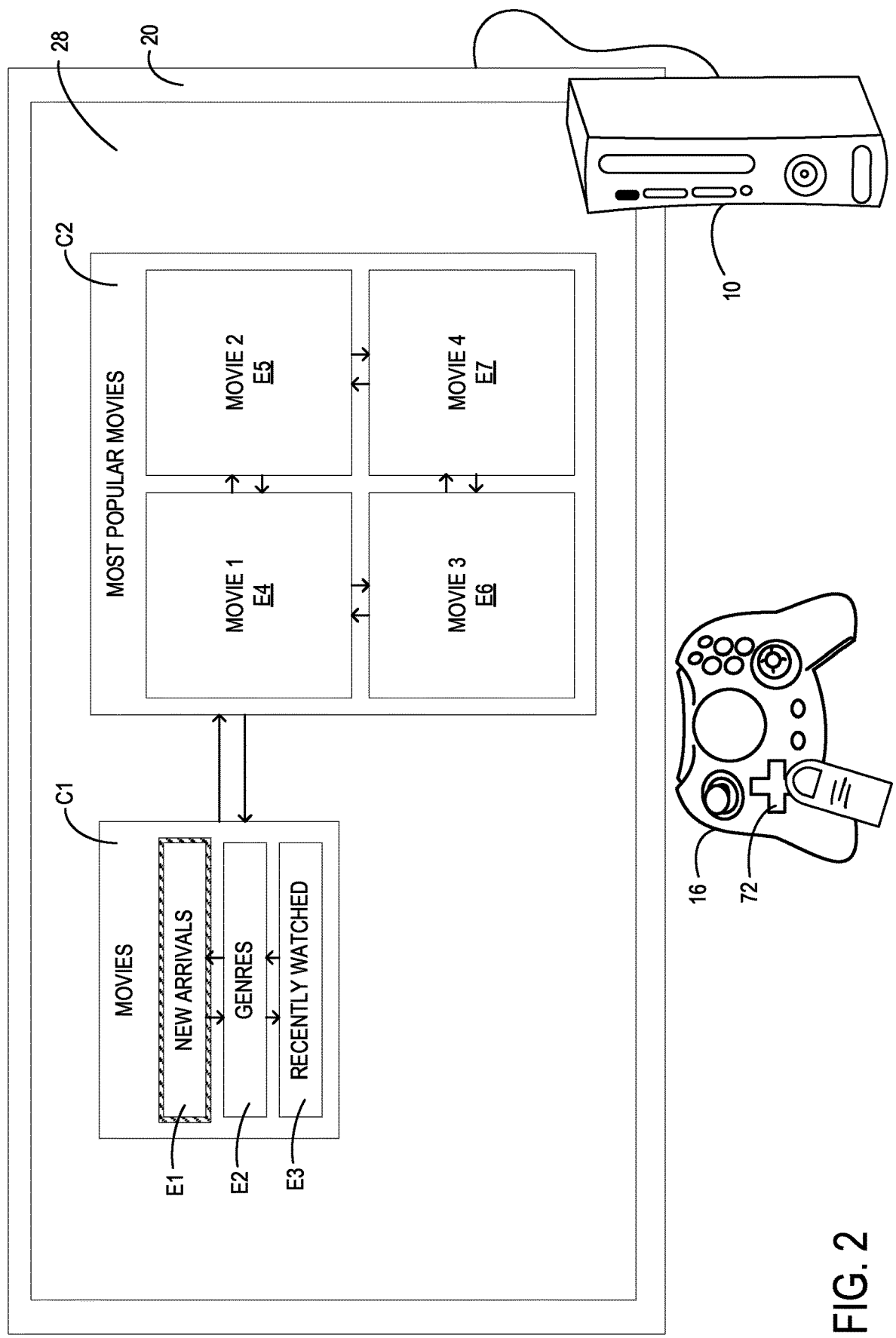
FIG. 2 illustrates an example GUI of FIG. 1.

Now turning to FIG. 2, an example graphical user interface 28 is illustrated. In this example, the computing device 10 is a console computing device configured to display the graphical user interface 28 on the associated display 20. The computing device 10 received user input from the input device 16, and received predetermined navigational input from the D-PAD 72 of the input device 16. The example graphical user interface 28 includes two predetermined user interface components C1, C2, and 7 focusable GUI elements E1-E7. As illustrated, the predetermined user interface component C1 is a dropdown menu that includes focusable GUI elements E1-E3. As a dropdown menu, the included focusable GUI elements E1-E3 are arranged in a vertical list, and the predetermined user interface component C1 has predetermined focus interactions of an up predetermined navigation direction input moving focus to a previous focusable GUI element included in the predetermined user interface component C2, and a down predetermined navigation direction input moving focus to a next focusable GUI element.

In the illustrated example, the currently focused GUI element is E1. If the user presses down on the DPAD 72 as shown, then the focus module 62 will move focus to focusable GUI element E2 according to the predetermined focus interactions discussed above. However, if the user presses up on the DPAD 72, then the focus module 62 will not move focus because there is no focusable GUI element previous to the focusable GUI element E1 included in the predetermined user interface component C1.

If the user presses right on the DPAD 72, the focus map entry 46 for the currently focused GUI element E1 will not indicate a target focusable GUI element for the right predetermined navigation direction. However, the focus module 62 will then query the precomputed focus map 44 with a component identifier for the predetermined user interface component C1 and the right predetermined navigation direction. As illustrated, the predetermined user interface component C2 is to the right of the predetermined user interface component C1. Thus, the component focus map entry 50 for the predetermined user interface component C1 will indicate a component identifier 38 of the predetermined user interface component C2 for the right predetermined navigation direction. Next, the focus module 62 will move focus to a focusable GUI element 32 included in the predetermined user interface component C2 according to the predetermined focus interactions 40 of the predetermined user interface component C2. For example, the focus module 62 may move focus to the first focusable GUI element 32 included in the predetermined user interface component C2, which is focusable GUI component E4 in the illustrated example.

Predetermined user interface component C2 is a grid component, and has different predetermined focus interactions 40 than the predetermined user interface component C1. For example, if the currently focused element is focusable GUI element E4, then when the user presses down on the D-PAD, the focus module 62 will move focus to focusable GUI element E6, which is not the next focusable GUI element in a list of focusable GUI elements included in the predetermined user interface component C2.

Figure 3:
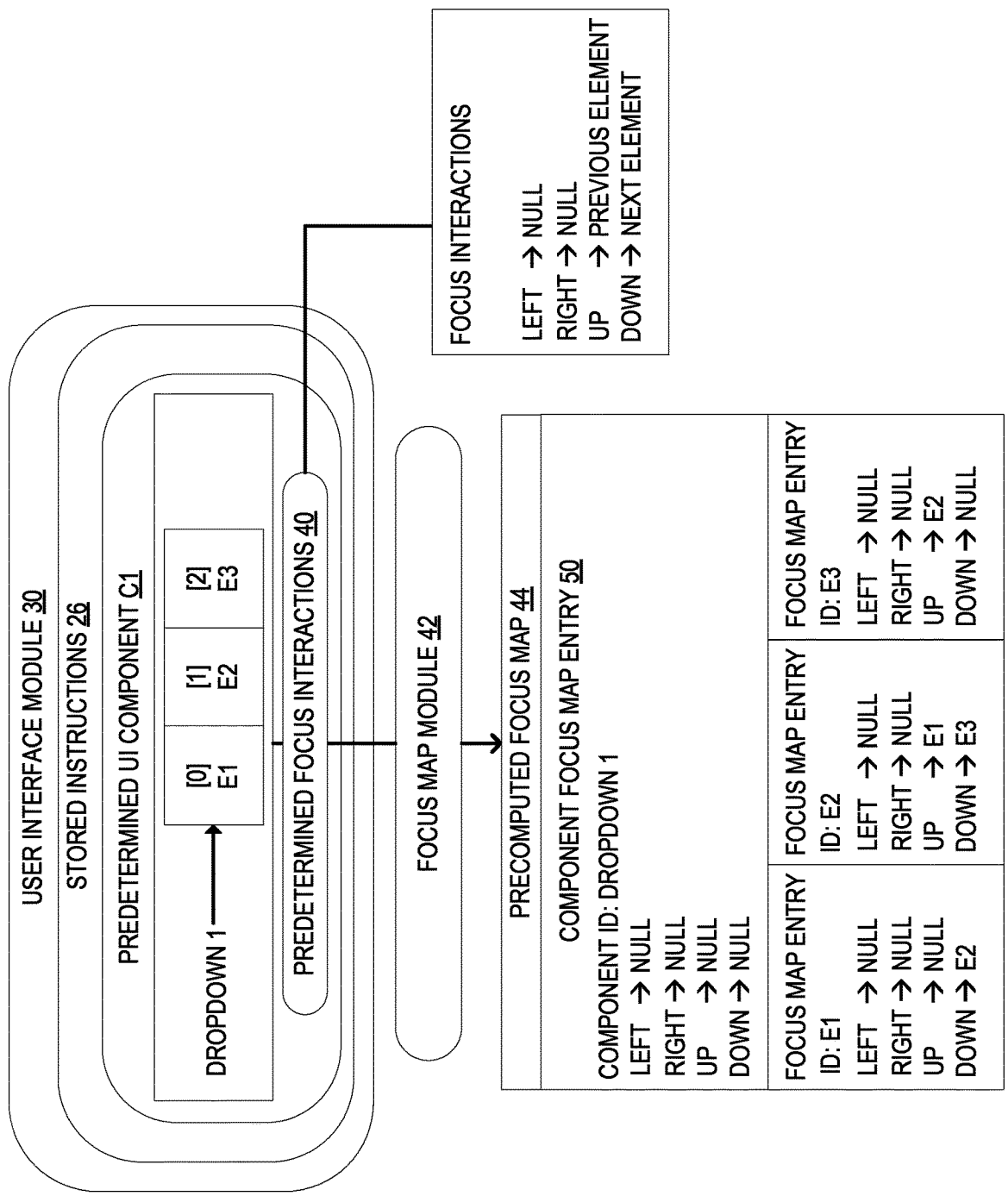
FIG. 3 illustrates the computing of an example focus map for the example GUI of FIG. 2.

FIG. 3 illustrates an example component focus map entry 50 for the predetermined user interface component C1 of example graphical user interface 28 of FIG. 2. As shown, the user interface module 30 includes stored instructions 26 for the predetermined user interface component C1 which includes focusable GUI elements E1-E3. The predetermined user interface component C1 is a dropdown menu with predetermined focus interactions 40 suitable for dropdown menus. In the illustrated example, the focusable GUI elements E1-E3 are stored in an array, however it will be appreciated that the focusable GUI elements may be stored in any type of suitable data structure. The predetermined focus interactions 40 for the dropdown menu include the focus interactions wherein an up predetermined navigation direction indicates a previous focusable GUI element in the array and a down predetermined navigation direction indicates a next focusable GUI element in the array. Thus, it will be appreciated that the focus interactions of the included focusable GUI elements may be determined by the focus map module 42 based on the predetermined focus interactions 40 without needing to perform a bounding rectangle algorithm or another algorithm to find a nearest neighbor focusable GUI element.

As illustrated, the focus map module 42 precomputes and stores the precomputed focus map 44, which includes a component focus map entry 50 and focus map entries 46 for each included focusable GUI element. As shown, each focus map entry 46 and the component focus map entry 50 indicates for one or more predetermined navigation directions, a target identifier for another predetermined user interface component or another focusable GUI element. However, not every predetermined navigation direction will indicate a target identifier. For example, the focus map entry for focusable GUI element E1 does not indicate a target identifier for the up predetermined navigation direction because there is no focusable GUI element previous to the focusable GUI element E1. Additionally, according to the predetermined focus map interactions 40 of the dropdown menu predetermined user interface component C1, no target identifier is indicated for the left and right predetermined navigation directions for each included focusable GUI element. FIG. 4 illustrates a complete precomputed focus map 44 for the example graphical user interface 28 of FIG. 2 that may be computed according to the process described above.

Figure 5:
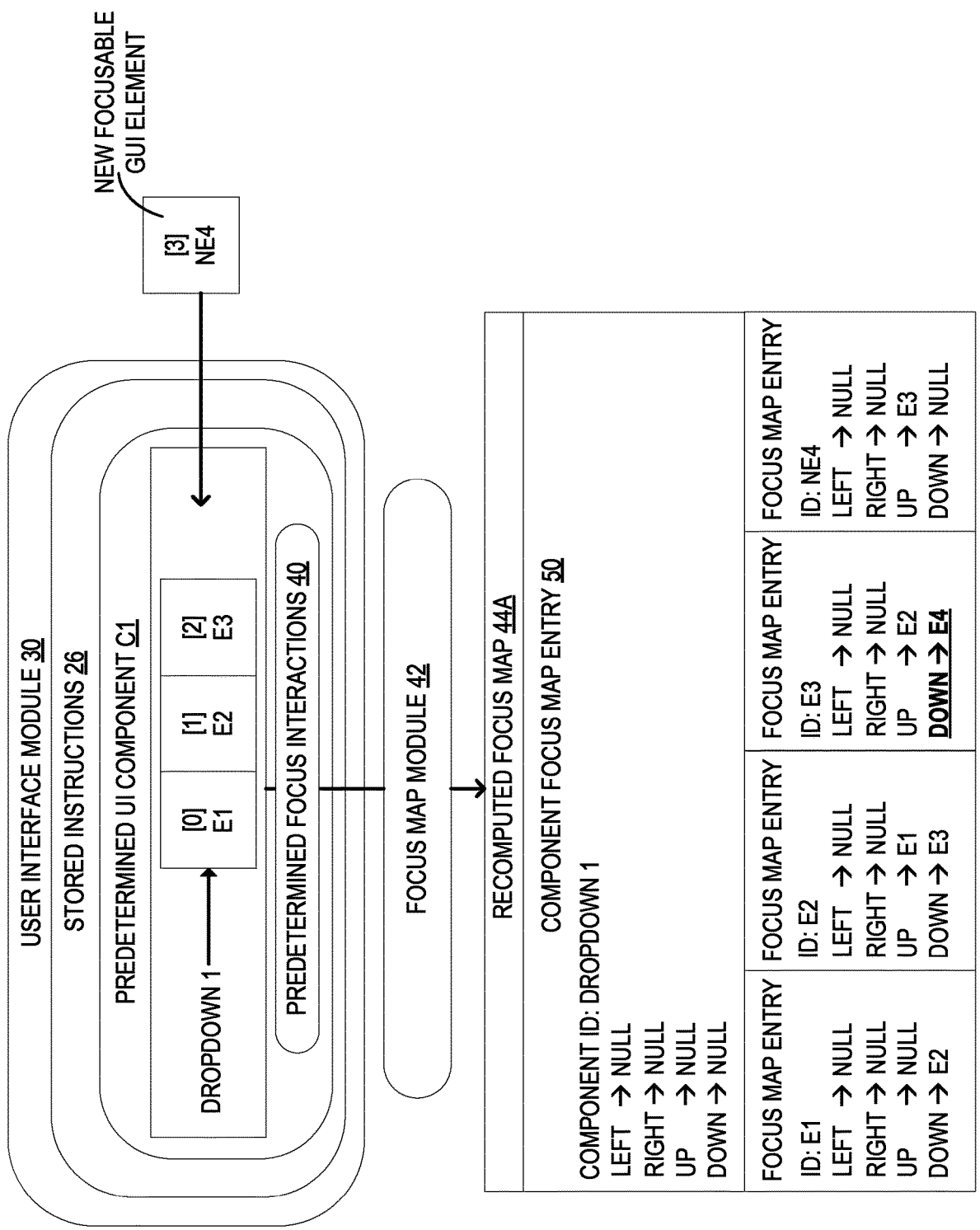
FIG. 5 illustrates an example of a recomputed focus map for the example GUI of FIG. 2.

FIG. 5 illustrates an example of recomputing the focus map of FIG. 3 after a new focusable GUI element NE4 has been added to the predetermined user interface component C1. As shown, the new focusable GUI element NE4 is added to the end of the array data structure of the predetermined user interface component C1. After this modification, the focus map module 42 recomputes the focus map to produce recomputed focus map 44A. As shown, a new focus map entry for the new focusable GUI element NE4 is added to the recomputed focus map 44A. The focus map module 42 recomputes the focus interactions between the focusable GUI element included in the predetermined user interface component C1 that was modified. Thus, based on the predetermined focus interactions 40 for a dropdown menu, the originally last focusable GUI element E3 in the array is recomputed such that the down predetermined navigation direction for the focus map entry indicates the next focusable GUI element in the array, which is the new focusable GUI element NE4. Similarly, the new focus map entry for the new focusable GUI element NE4 is computed based on the predetermined focus interactions 40 such that the up predetermined navigation direction indicates the previous focusable GUI element in the array, which is the focusable GUI element E3.

Figure 6:
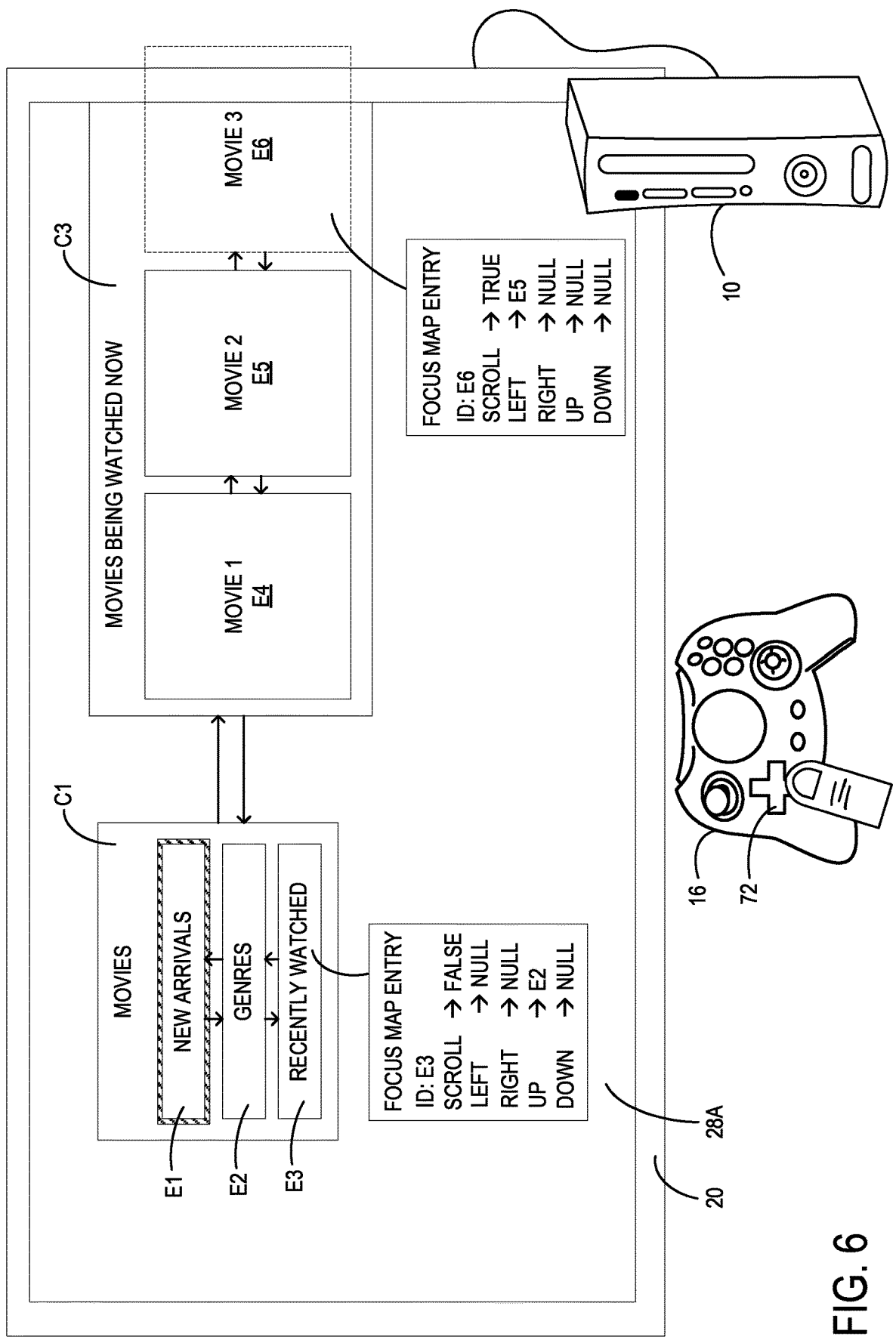
FIG. 6 illustrates a second example GUI of FIG. 1.

Now turning to FIG. 6, a second example graphical user interface 28A is illustrated. The graphical user interface 28A includes a predetermined user interface component C3, which is a horizontal list and includes the focusable GUI elements E4-E6. As shown, the focusable GUI elements E1-E5 fit in the viewport for the graphical user interface 28A shown on the display 20. Thus, the focus map entries for the focusable GUI elements E1-E5 may include a scroll flag 68 indicating that the display 20 will not be scrolled when focus is moved to the focusable GUI element of that focus map entry. Accordingly, the focus module 62 may safely move focus to the focusable GUI elements E1-E5 without needing to perform visibility calculations and layout passes of the graphical user interface 28A.

However, as illustrated, the focusable GUI element E6 does not fit in the viewport for the graphical user interface 28A shown on the display 20, and would need the display 20 to be scrolled when focus is moved to focusable GUI element E6. Thus, the focus map entry of the focusable GUI element E6 includes a scrolled flag 68 indicating that the display 20 will be scrolled when focus is moved to the focusable GUI element E6. Accordingly, the computer program 22 will need to perform visibility calculations and layout passes of the graphical user interface 28A when moving focus to the focusable GUI element E6. Additionally, after focus has been moved to the focusable GUI element E6, and the display 20 has been scrolled, the other focusable GUI elements E1-E3 may no longer fit in the viewport for the graphical user interface 28A. Thus, the focus module 62 may recompute the focus map entries for the focusable GUI element E1-E3 to change the corresponding scroll flags.

Figure 7:
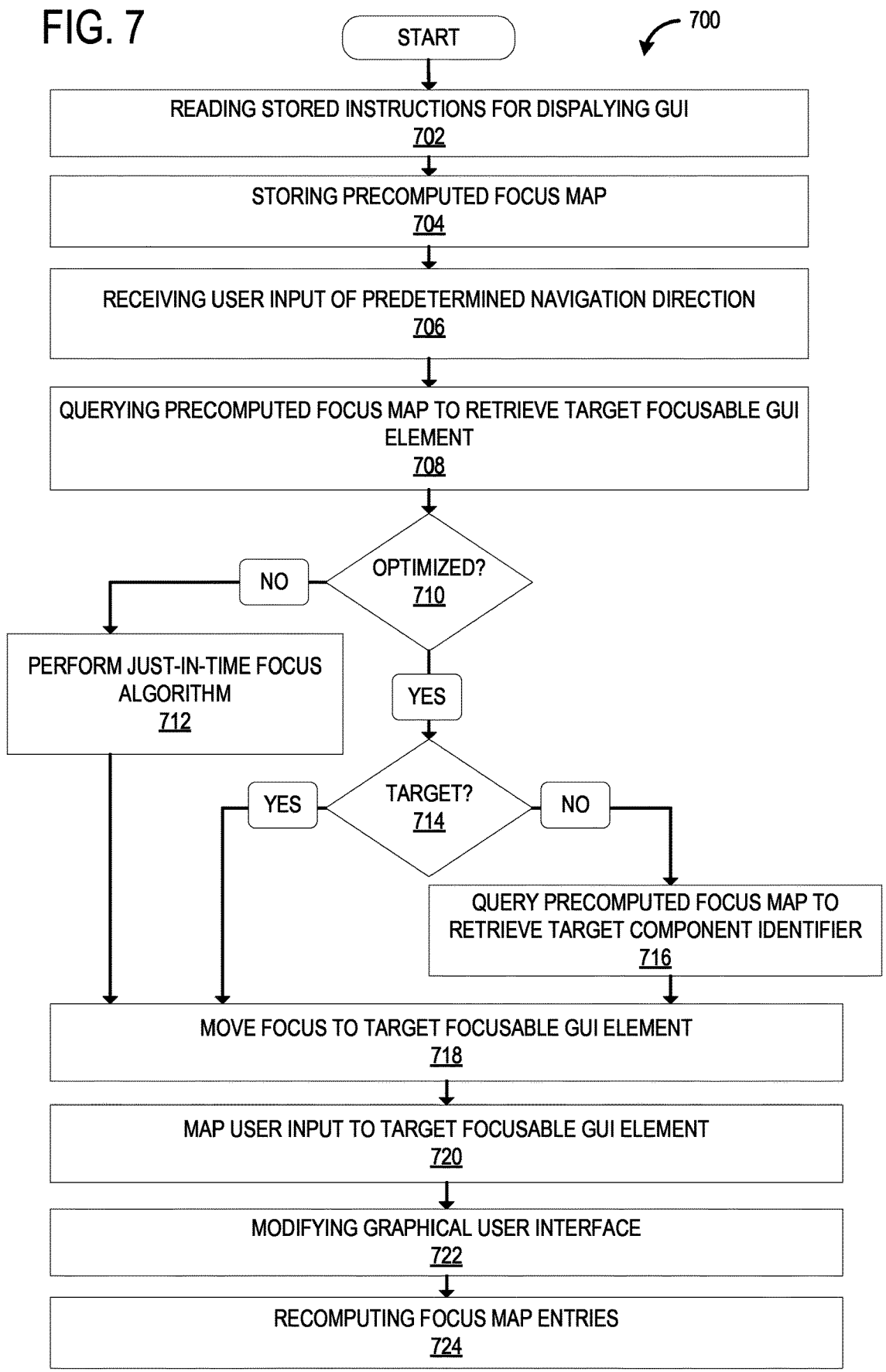
FIG. 7 shows a method for the directional navigation of a graphical user interface of FIG. 1.

FIG. 7 shows an example method 700 for directional navigation of a graphical user interface according to an embodiment of the present description. At step 702, the method 700 may include reading stored instructions for displaying a graphical user interface on a display associated with a computing device, the stored instructions including code for a plurality of focusable GUI elements, each focusable GUI element having an associated identifier. In one embodiment, the graphical user interface includes a plurality of predetermined user interface components, each predetermined user interface component having an associated component identifier, including one or more of the plurality of focusable GUI elements, and having predetermined focus interactions for the one or more included focusable GUI elements.

Advancing from step 702 to step 704, the method 700 may include storing a precomputed focus map including a focus map entry for each focusable GUI element indicating, for that focusable GUI element, for one or more of a plurality of predetermined navigation directions, a target identifier of a target focusable GUI element for that predetermined navigation direction. In one embodiment, the precomputed focus map further includes a component focus map entry for each predetermined user interface component indicating, for that predetermined user interface component, for one or more of the plurality of predetermined navigation directions, a target component identifier of a target predetermined user interface component. In another embodiment, each focus map entry further includes a scroll flag indicating whether the display will be scrolled when moving focus to a focusable GUI element of that focus map entry.

Additionally, the plurality of focusable GUI elements includes a subset of focusable GUI elements for which focus interactions are not precomputed, and each focus map entry for the subset of focusable GUI elements includes an optimization flag indicating that the focus interactions of that focusable GUI element are not precomputed.

Proceeding from step 704 to step 706, the method 700 may include receiving a user input of a predetermined navigation direction via a user input device associated with the computing device.

Advancing from step 706 to step 708, the method 700 may include querying the precomputed focus map with an identifier of a currently focused GUI element and the predetermined navigation direction for retrieving a target identifier of a target focusable GUI element.

Proceeding from step 708 to step 710, the method 700 may including determining whether a focus map entry for the currently focused GUI element includes an optimization flag indicating that the focus interactions of that focusable GUI element are not precomputed. If the focus map entry for the currently focused GUI element includes an optimization flag indicating that the focus interactions of that focusable GUI element are not precomputed, the method 700 advances from step 710 to step 712 and may include performing a just-in-time focus algorithm to determine a target focusable GUI element. Next, the method 700 proceeds from step 712 to step 718 and may include moving focus to the target focusable GUI element.

On the other hand, if the focus map entry for the currently focused GUI element includes an optimization flag indicating that the focus interactions of that focusable GUI element are precomputed, the method 700 advances from step 710 to step 714 and may include determining whether a target focusable GUI element is indicated for the predetermined navigation direction for the currently focused element. If a determination is made that a target focusable GUI element is indicated for the predetermined navigation direction for the currently focused element, the method 700 proceeds from step 714 to step 718 and may include moving focus to the target focusable GUI element.

On the other hand, if a determination is made that no target focusable GUI element is indicated for the predetermined navigation direction for the currently focused element, the method 700 advances from step 714 to step 716 and may include querying the precomputed focus map with a component identifier of a predetermined user interface component that includes the currently focused element and the predetermined navigation direction for retrieving a target component identifier of a target predetermined user interface component. Next the method 700 proceeds from step 716 to step 718 and may include moving focus to a focusable GUI element included in the target predetermined user interface component, as the target focusable GUI element.

In one embodiment, step 718 of method 700 further includes, if a focus map entry for the target focusable GUI element includes a scroll flag indicating that the display will not be scrolled, moving focus to the target focusable GUI element without performing visibility calculations and layout passes of the graphical user interface.

The method 700 advances from step 718 to step 720 and may include mapping user input to the target focusable GUI element.

The method 700 proceeds from step 720 to step 722 and may include modifying the graphical user interface to add a new focusable GUI element to a predetermined user interface component, remove a focusable GUI element included in the predetermined user interface component, or modify a focusable GUI element included in the predetermined user interface component. If the graphical user interface has been modified, the method 700 proceeds from step 722 to step 724 and may include recomputing focus map entries for each focusable GUI element included in the predetermined user interface component based on the predetermined focus interactions of the predetermined user interface component.

The above described systems and methods offer the potential advantage of increased speed processing navigation direction inputs to change focusable GUI elements in a GUI, thereby potentially the drawbacks of stuttering and slow response times discussed above, which are particularly problematic when limited processing bandwidth is available. However, the systems and methods described herein are not limited to addressing these drawbacks, and may be applied to devices even when ample processing power is available and such drawbacks are not as pronounced.

It will be appreciated that the computing device 10 illustrated in FIG. 1 and described herein may take the form of one or more personal computers, server computers, tablet computers, home-entertainment computers, network computing devices, gaming devices, mobile computing devices, mobile communication devices (e.g., smart phone), and/or other computing devices.

Each such computing device includes a processor, volatile memory, and non-volatile memory, as well as a display, input device, and communication system configured to enable the computing device to communicate with other devices via a computer network.

The processor of each computing device is configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processor of each device is typically configured to execute software instructions that are stored in non-volatile memory using portions of volatile memory. Additionally or alternatively, the processor may include one or more hardware or firmware processors configured to execute hardware or firmware instructions. Processors used by the devices described herein may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

Non-volatile memory is configured to hold software instructions even when power is cut to the device, and may include optical memory (e.g., CD, DVD, HD-DVD, Blu-Ray Disc, etc.), solid state memory (e.g., EPROM, EEPROM, FLASH memory, etc.), and/or magnetic memory (e.g., hard-disk drive, floppy-disk drive, tape drive, MRAM, etc.), among others. Volatile memory is configured to hold software instructions and data temporarily during execution of programs by the processor, and typically such data is lost when power is cut to the device. Examples of volatile memory that may be used include RAM, DRAM, etc.

Aspects of processor, non-volatile memory, and volatile memory may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing device 10 implemented to perform a particular function. In some cases, a module, program, or engine may be instantiated via a processor executing instructions stored in non-volatile memory using portions of volatile memory at execution time. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

Each computing device may include an associated display, which may be used to present a visual representation of data computed and output by the processor. This visual representation may take the form of a graphical user interface (GUI). Such display devices may be combined with processor, volatile memory, and non-volatile memory in a shared enclosure, or such display devices may be peripheral display devices. Touch screens may be utilized that function both as a display and as an input device.

Each computing device may include a user input device such as a keyboard, mouse, touch pad, touch screen, microphone or game controller.

Each computing device may include a communication subsystem configured to communicatively couple the computing device with one or more other computing devices. The communication subsystem may include wired and/or wireless communication devices compatible with one or more different communication protocols. As non-limiting examples, the communication subsystem may be configured for communication via a wireless telephone or data network, or a wired or wireless local- or wide-area network. In some embodiments, the communication subsystem may allow the computing device to send and/or receive messages to and/or from other devices via a network such as the Internet.

The subject matter of the present disclosure is further described in the following paragraphs. One aspect provides a computing device, comprising: a computer program executed on a processor of the computing device, including: a rendering module configured to read stored instructions to display a graphical user interface (GUI) on a display associated with the computing device, the stored instructions including code for a plurality of focusable GUI elements, each focusable GUI element having an associated identifier, a focus map module configured to store a precomputed focus map including a focus map entry for each focusable GUI element indicating, for that focusable GUI element, for one or more of a plurality of predetermined navigation directions, a target identifier of a target focusable GUI element for that predetermined navigation direction, a user input module configured to receive a user input of a predetermined navigation direction via a user input device associated with the computing device, a focus module configured to query the precomputed focus map with an identifier of a currently focused GUI element and the predetermined navigation direction to retrieve a target identifier of a target focusable GUI element and move focus to the target focusable GUI element, and wherein the user input module is further configured to map user input to the target focusable GUI element.

In this aspect, the computing device may additionally or alternatively include, wherein the graphical user interface includes a plurality of predetermined user interface components, each predetermined user interface component having an associated component identifier, including one or more of the plurality of focusable GUI elements, and having predetermined focus interactions for the one or more included focusable GUI elements.

In this aspect, the computing device may additionally or alternatively include, wherein the precomputed focus map further includes a component focus map entry for each predetermined user interface component indicating, for that predetermined user interface component, for one or more of the plurality of predetermined navigation directions, a target component identifier of a target predetermined user interface component.

In this aspect, the computing device may additionally or alternatively include, wherein the focus module is further configured to, if a determination is made that no target focusable GUI element is indicated for the predetermined navigation direction for the currently focused element, query the precomputed focus map with a component identifier of a predetermined user interface component that includes the currently focused element and the predetermined navigation direction to retrieve a target component identifier of a target predetermined user interface component and move focus to a focusable GUI element included in the target predetermined user interface component.

In this aspect, the computing device may additionally or alternatively include, wherein the computing program further includes a user interface module configured to modify the graphical user interface to add a new focusable GUI element to a predetermined user interface component, remove a focusable GUI element included in the predetermined user interface component, or modify a focusable GUI element included in the predetermined user interface component. The computing device may additionally or alternatively include, wherein if the graphical user interface has been modified, the focus map module is further configured to recompute focus map entries for each focusable GUI element included in the predetermined user interface component based on the predetermined focus interactions of the predetermined user interface component.

In this aspect, the computing device may additionally or alternatively include, wherein each focus map entry further includes a scroll flag indicating whether the display will be scrolled when the focus module moves focus to a focusable GUI element of that focus map entry. The computing device may additionally or alternatively include, wherein if a focus map entry for the target focusable GUI element includes a scroll flag indicating that the display will not be scrolled, the focus module is further configured to move focus to the target focusable GUI element without performing visibility calculations and layout passes of the graphical user interface.

In this aspect, the computing device may additionally or alternatively include, wherein the plurality of focusable GUI elements includes a subset of focusable GUI elements for which focus interactions are not precomputed, and each focus map entry for the subset of focusable GUI elements includes an optimization flag indicating that the focus interactions of that focusable GUI element are not precomputed.

In this aspect, the computing device may additionally or alternatively include, wherein if the focus map entry for the currently focused GUI element includes an optimization flag indicating that the focus interactions of that focusable GUI element are not precomputed, the focus module is further configured to perform a just-in-time focus algorithm to determine a target focusable GUI element.

Another aspect provides a method, comprising: reading stored instructions for displaying a graphical user interface on a display associated with a computing device, the stored instructions including code for a plurality of focusable GUI elements, each focusable GUI element having an associated identifier, storing a precomputed focus map including a focus map entry for each focusable GUI element indicating, for that focusable GUI element, for one or more of a plurality of predetermined navigation directions, a target identifier of a target focusable GUI element for that predetermined navigation direction, receiving a user input of a predetermined navigation direction via a user input device associated with the computing device, querying the precomputed focus map with an identifier of a currently focused GUI element and the predetermined navigation direction for retrieving a target identifier of a target focusable GUI element, moving focus to the target focusable GUI element, and mapping user input to the target focusable GUI element. The method may additionally or alternatively include, wherein the graphical user interface includes a plurality of predetermined user interface components, each predetermined user interface component having an associated component identifier, including one or more of the plurality of focusable GUI elements, and having predetermined focus interactions for the one or more included focusable GUI elements.

In this aspect, the method may additionally or alternatively include, wherein the precomputed focus map further includes a component focus map entry for each predetermined user interface component indicating, for that predetermined user interface component, for one or more of the plurality of predetermined navigation directions, a target component identifier of a target predetermined user interface component.

In this aspect, the method may additionally or alternatively include, if a determination is made that no target focusable GUI element is indicated for the predetermined navigation direction for the currently focused element, querying the precomputed focus map with a component identifier of a predetermined user interface component that includes the currently focused element and the predetermined navigation direction for retrieving a target component identifier of a target predetermined user interface component and moving focus to a focusable GUI element included in the target predetermined user interface component.

In this aspect, the method may additionally or alternatively include, modifying the graphical user interface to add a new focusable GUI element to a predetermined user interface component, remove a focusable GUI element included in the predetermined user interface component, or modify a focusable GUI element included in the predetermined user interface component.

In this aspect, the method may additionally or alternatively include, if the graphical user interface has been modified, recomputing focus map entries for each focusable GUI element included in the predetermined user interface component based on the predetermined focus interactions of the predetermined user interface component.

In this aspect, the method may additionally or alternatively include, wherein each focus map entry further includes a scroll flag indicating whether the display will be scrolled when moving focus to a focusable GUI element of that focus map entry.

In this aspect, the method may additionally or alternatively include, if a focus map entry for the target focusable GUI element includes a scroll flag indicating that the display will not be scrolled, moving focus to the target focusable GUI element without performing visibility calculations and layout passes of the graphical user interface.

In this aspect, the method may additionally or alternatively include, wherein the plurality of focusable GUI elements includes a subset of focusable GUI elements for which focus interactions are not precomputed, and each focus map entry for the subset of focusable GUI elements includes an optimization flag indicating that the focus interactions of that focusable GUI element are not precomputed, and wherein the method further comprises, if the focus map entry for the currently focused GUI element includes an optimization flag indicating that the focus interactions of that focusable GUI element are not precomputed, performing a just-in-time focus algorithm to determine a target focusable GUI element.

Another aspect provides a computing device, comprising: a computer program executed on a processor of the computing device, including, a rendering module configured to read stored instructions to display a graphical user interface (GUI) on a display associated with the computing device, the stored instructions including code for a plurality of focusable GUI elements, each focusable GUI element having an associated identifier, a focus map module configured to compute a focus map including a focus map entry for each focusable GUI element indicating, for that focusable GUI element, for one or more of a plurality of predetermined navigation directions, a target identifier of a target focusable GUI element for that predetermined navigation direction, a user input module configured to receive a user input of a predetermined navigation direction via a user input device associated with the computing device, and a focus module configured to query the focus map with an identifier of a currently focused GUI element and the predetermined navigation direction to retrieve a target identifier of a target focusable GUI element and move focus to the target focusable GUI element, wherein the user input module is further configured to map user input to the target focusable GUI element.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
   a processor configured to execute instructions for a computer program stored on a non-volatile or volatile memory device, the computer program including:
   a rendering module configured to read stored instructions to display a graphical user interface (GUI) on a display associated with the computing device, the stored instructions including code for a plurality of focusable GUI elements, each focusable GUI element having an associated identifier;
   a focus map module configured to store a precomputed focus map including a focus map entry for each focusable GUI element indicating, for that focusable GUI element, for one or more of a plurality of predetermined navigation directions, a target identifier of a target focusable GUI element for that predetermined navigation direction, and a precomputed scroll flag indicating whether the display will be scrolled when the focus module moves focus to a focusable GUI element of that focus map entry, the precomputed scroll flags being computed via visibility calculations and layout passes of the graphical user interface at run-time, build time, or compile time;
   a user input module configured to receive a user input of a predetermined navigation direction via a user input device associated with the computing device after the precomputed focus map has been computed and stored;
   a focus module configured to query the precomputed focus map with an identifier of a currently focused GUI element and the predetermined navigation direction to retrieve a target identifier of a target focusable GUI element and move focus to the target focusable GUI element without scrolling the display if a focus map entry for the target focusable GUI element includes a precomputed scroll flag computed and stored for that focus map entry prior to receiving the user input that indicates that the display will not be scrolled; and
   wherein the user input module is further configured to map user input to the target focusable GUI element.

2. The computing device of claim 1, wherein the graphical user interface includes a plurality of predetermined user interface components, each predetermined user interface component having an associated component identifier, including one or more of the plurality of focusable GUI elements, and having predetermined focus interactions for the one or more included focusable GUI elements.

3. The computing device of claim 2, wherein the precomputed focus map further includes a component focus map entry for each predetermined user interface component indicating, for that predetermined user interface component, for one or more of the plurality of predetermined navigation directions, a target component identifier of a target predetermined user interface component.

4. The computing device of claim 3, wherein the focus module is further configured to,
   if a determination is made that no target focusable GUI element is indicated for the predetermined navigation direction for the currently focused element, query the precomputed focus map with a component identifier of a predetermined user interface component that includes the currently focused element and the predetermined navigation direction to retrieve a target component identifier of a target predetermined user interface component and move focus to a focusable GUI element included in the target predetermined user interface component.

5. The computing device of claim 3, wherein the computing program further includes a user interface module configured to modify the graphical user interface to add a new focusable GUI element to a predetermined user interface component, remove a focusable GUI element included in the predetermined user interface component, or modify a focusable GUI element included in the predetermined user interface component.

6. The computing device of claim 5, wherein if the graphical user interface has been modified, the focus map module is further configured to recompute focus map entries for each focusable GUI element included in the predetermined user interface component based on the predetermined focus interactions of the predetermined user interface component.

7. The computing device of claim 1, wherein the plurality of focusable GUI elements includes a subset of focusable GUI elements for which focus interactions are not precomputed, and each focus map entry for the subset of focusable GUI elements includes an optimization flag indicating that the focus interactions of that focusable GUI element are not precomputed.

8. The computing device of claim 7, wherein if the focus map entry for the currently focused GUI element includes an optimization flag indicating that the focus interactions of that focusable GUI element are not precomputed, the focus module is further configured to perform a just-in-time focus algorithm to determine a target focusable GUI element.

9. A method, comprising:
reading stored instructions for displaying a graphical user interface on a display associated with a computing device, the stored instructions including code for a plurality of focusable GUI elements, each focusable GUI element having an associated identifier;
storing a precomputed focus map including a focus map entry for each focusable GUI element indicating, for that focusable GUI element, for one or more of a plurality of predetermined navigation directions, a target identifier of a target focusable GUI element for that predetermined navigation direction, and a precomputed scroll flag indicating whether the display will be scrolled when the focus module moves focus to a focusable GUI element of that focus map entry, the precomputed scroll flags being computed via visibility calculations and layout passes of the graphical user interface at run-time, build time, or compile time;
receiving a user input of a predetermined navigation direction via a user input device associated with the computing device after the precomputed focus map has been computed and stored;
querying the precomputed focus map with an identifier of a currently focused GUI element and the predetermined navigation direction for retrieving a target identifier of a target focusable GUI element;
moving focus to the target focusable GUI element without scrolling the display if a focus map entry for the target focusable GUI element includes a precomputed scroll flag computed and stored for that focus map entry prior to receiving the user input that indicates that the display will not be scrolled; and
mapping user input to the target focusable GUI element.

10. The method of claim 9, wherein the graphical user interface includes a plurality of predetermined user interface components, each predetermined user interface component having an associated component identifier, including one or more of the plurality of focusable GUI elements, and having predetermined focus interactions for the one or more included focusable GUI elements.

11. The method of claim 10, wherein the precomputed focus map further includes a component focus map entry for each predetermined user interface component indicating, for that predetermined user interface component, for one or more of the plurality of predetermined navigation directions, a target component identifier of a target predetermined user interface component.

12. The method of claim 11, further comprising:
if a determination is made that no target focusable GUI element is indicated for the predetermined navigation direction for the currently focused element, querying the precomputed focus map with a component identifier of a predetermined user interface component that includes the currently focused element and the predetermined navigation direction for retrieving a target component identifier of a target predetermined user interface component and moving focus to a focusable GUI element included in the target predetermined user interface component.

13. The method of claim 11, further comprising:
modifying the graphical user interface to add a new focusable GUI element to a predetermined user interface component, remove a focusable GUI element included in the predetermined user interface component, or modify a focusable GUI element included in the predetermined user interface component.

14. The method of claim 13, further comprising:
if the graphical user interface has been modified, recomputing focus map entries for each focusable GUI element included in the predetermined user interface component based on the predetermined focus interactions of the predetermined user interface component.

15. The method of claim 9, wherein the plurality of focusable GUI elements includes a subset of focusable GUI elements for which focus interactions are not precomputed, and each focus map entry for the subset of focusable GUI elements includes an optimization flag indicating that the focus interactions of that focusable GUI element are not precomputed; and
wherein the method further comprises, if the focus map entry for the currently focused GUI element includes an optimization flag indicating that the focus interactions of that focusable GUI element are not precomputed, performing a just-in-time focus algorithm to determine a target focusable GUI element.

16. A computing device, comprising:
a processor configured to execute instructions for a computer program stored on a non-volatile or volatile memory device, the computer program including:
a rendering module configured to read stored instructions to display a graphical user interface (GUI) on a display associated with the computing device, the stored instructions including code for a plurality of focusable GUI elements, each focusable GUI element having an associated identifier;
a focus map module configured to compute and store a focus map including a focus map entry for each focusable GUI element indicating, for that focusable GUI element, for one or more of a plurality of predetermined navigation directions, a target identifier of a target focusable GUI element for that predetermined navigation direction, and a precomputed scroll flag indicating whether the display will be scrolled when the focus module moves focus to a focusable GUI element of that focus map entry, the precomputed scroll flags being computed via visibility calculations and layout passes of the graphical user interface at run-time, build time, or compile time;
a user input module configured to receive a user input of a predetermined navigation direction via a user input device associated with the computing device after the computed focus map has been computed and stored; and
a focus module configured to query the focus map with an identifier of a currently focused GUI element and the predetermined navigation direction to retrieve a target identifier of a target focusable GUI element and move focus to the target focusable GUI element without scrolling the display if a focus map entry for the target focusable GUI element includes a precomputed scroll flag computed and stored for that focus map entry prior to receiving the user input that indicates that the display will not be scrolled;
wherein the user input module is further configured to map user input to the target focusable GUI element.

* * * * *